May 6, 1969     J. F. SCHERER     3,441,997
METHOD OF MAKING TIRE VALVE INSERTS
Filed Aug. 31, 1964     Sheet 1 of 3
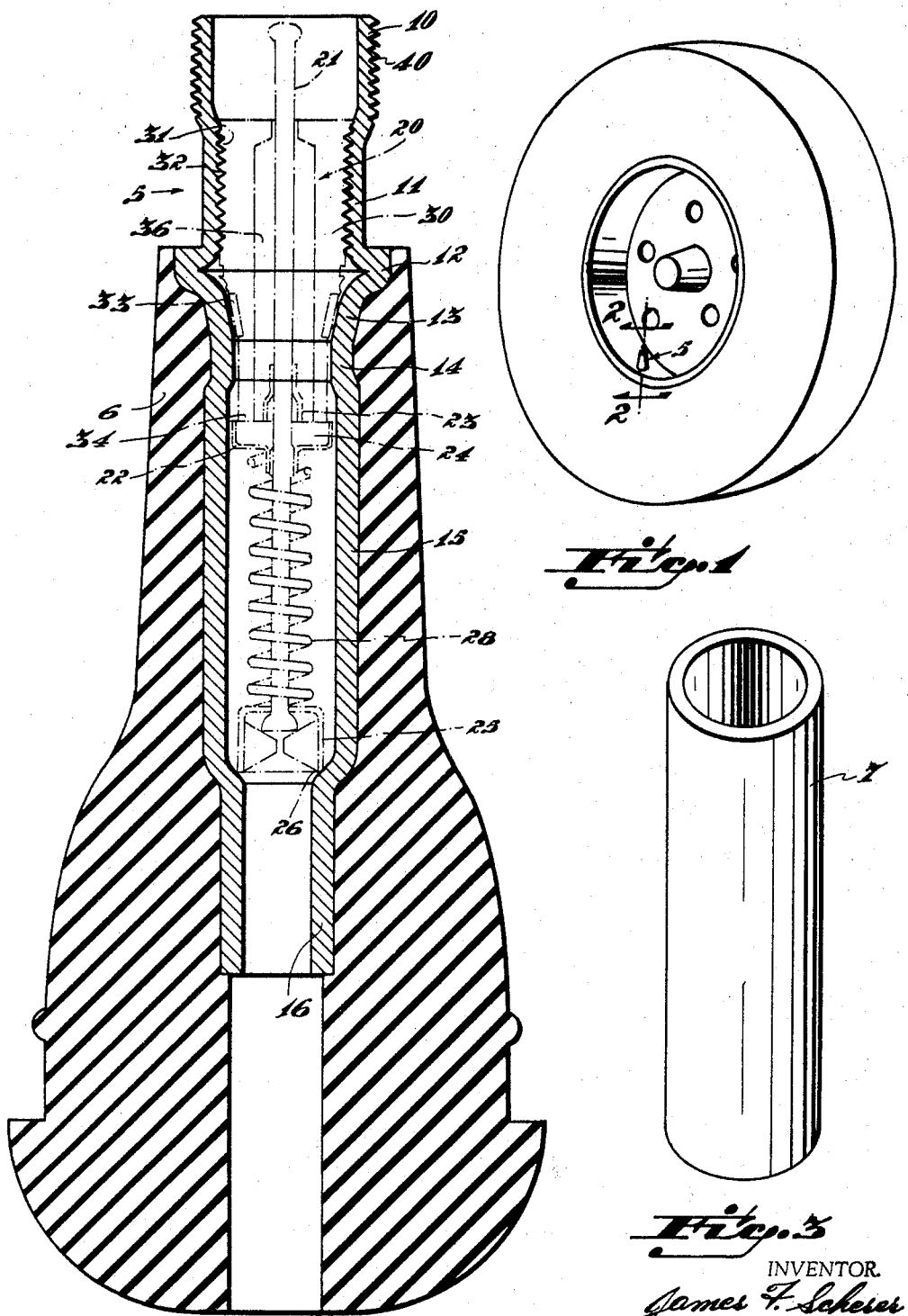
INVENTOR.
James F. Scherer
BY Wood, Herron & Evans
ATTORNEYS

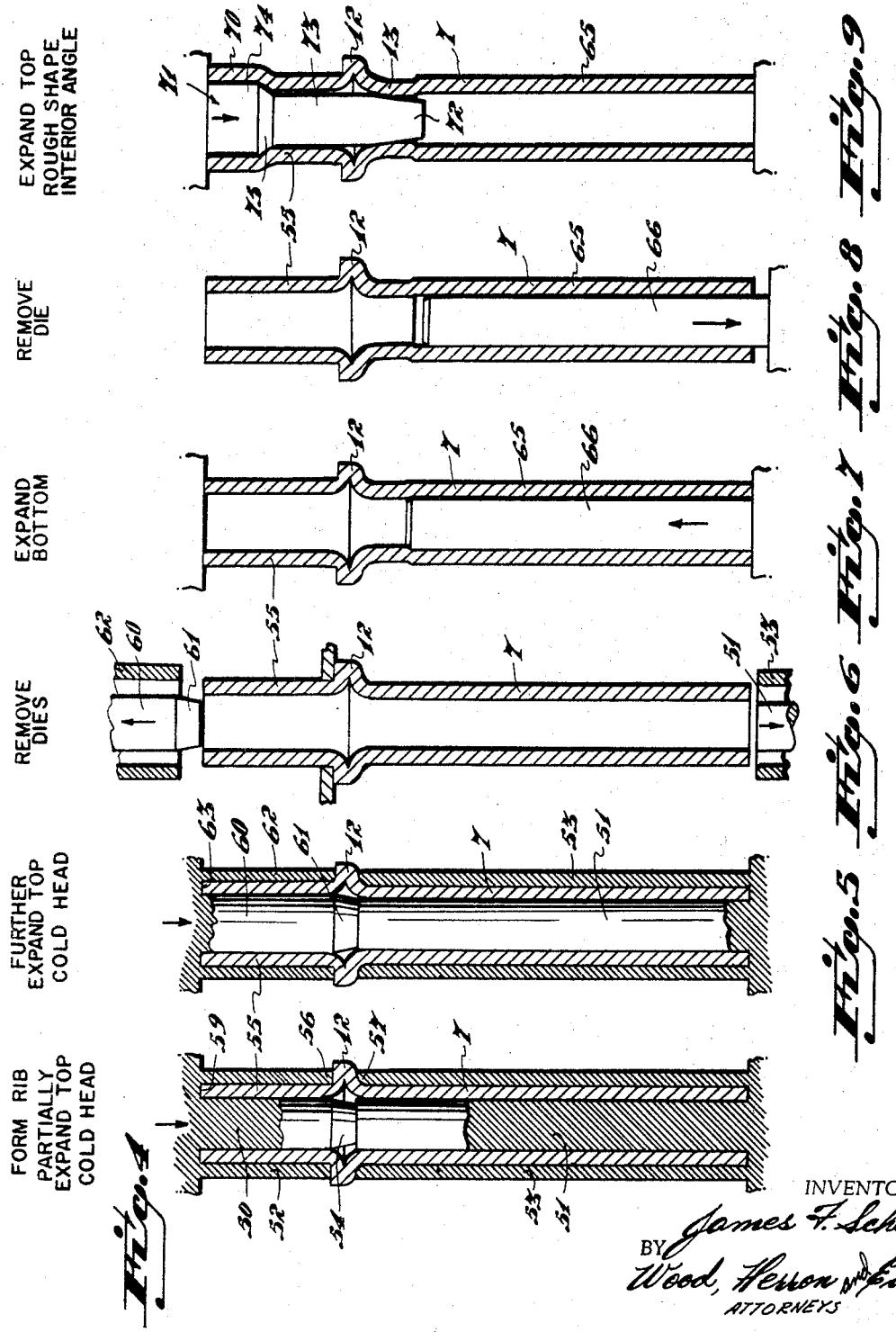

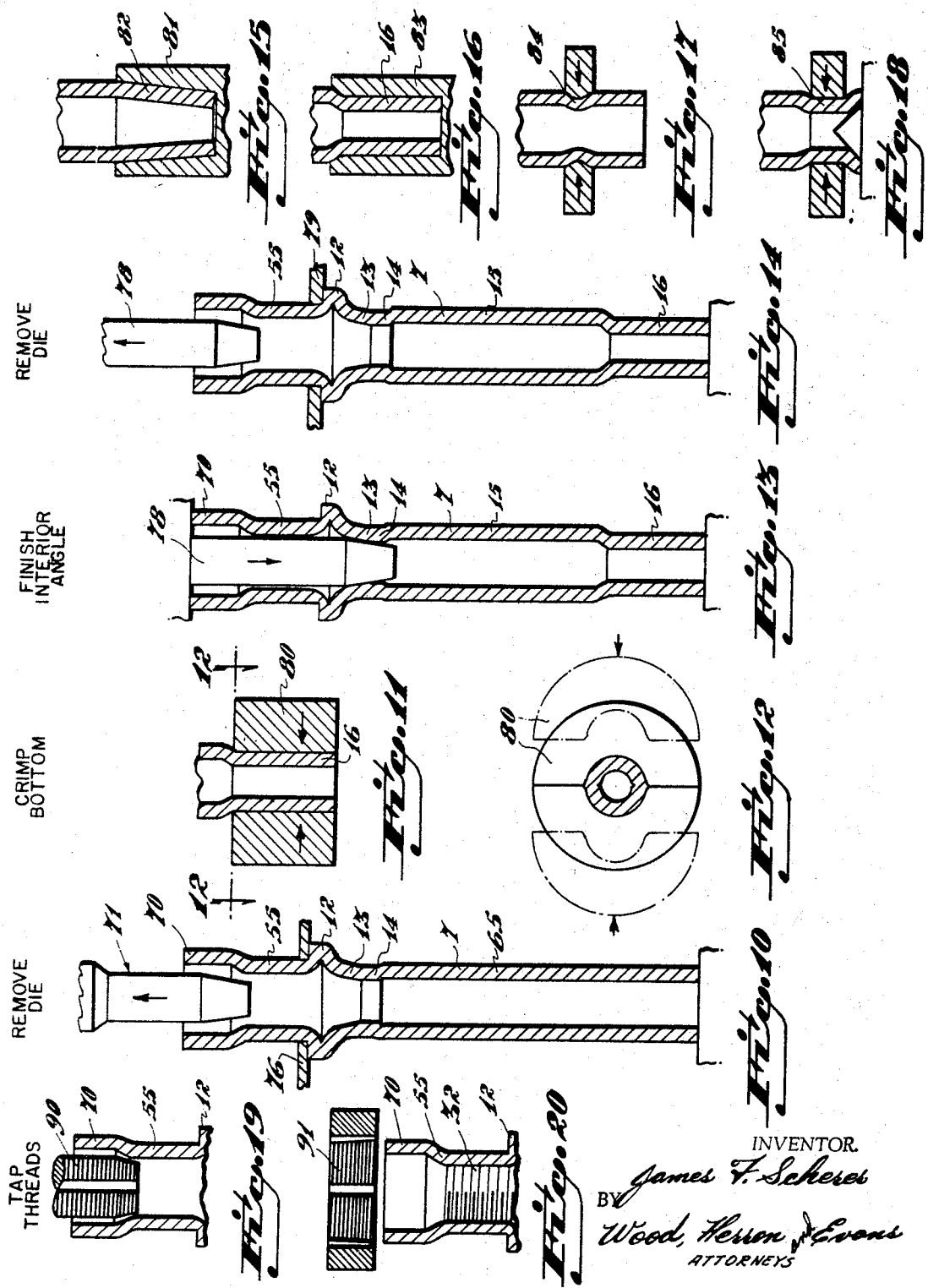

United States Patent Office 3,441,997
Patented May 6, 1969

3,441,997
METHOD OF MAKING TIRE VALVE INSERTS
James F. Scherer, Box 210, Milford, Ohio 45150
Continuation-in-part of application Ser. No. 387,070,
Aug. 3, 1964. This application Aug. 31, 1964, Ser.
No. 394,382
Int. Cl. B21d 53/00
U.S. Cl. 29—157.1
9 Claims

ABSTRACT OF THE DISCLOSURE

A method of making tire valve inserts from a cylindrical metal tube comprising the steps of axially compressing to form a peripheral flange, radially expanding, forming internal tapers, and threading various internal as well as external sections of said tube.

---

This invention relates to pneumatic valve stem assemblies and particularly to the inserts and the method of manufacturing the inserts which go to make up such assemblies. "Insert" is a term used in the tire industry to denote the external sleeve which surrounds the operating parts of the valve or the so-called valve core. This application is a continuation in part of my application Ser. No. 387,070 filed Aug. 3, 1964, now abandoned.

Inserts of pneumatic valves for use in tubeless tires are conventionally and commercially made upon an automatic screw machine. These machine are very high speed and are capable of manufacturing thousands of pieces per hour from solid bar stock. However, an inherent limitation of the machining process is the waste which accompanies it. Percentage-wise, a large amount of starting material ends up as scrap metal which can be salvaged but which nonetheless increases the cost of the finished product.

It has been an objective of this invention to reduce the cost to the consumer of tubeless tire valve inserts and particularly to do so by minimizing the amount of scrap metal produced during the production of the part. This objective has been accomplished by this invention by forming the complete metal insert from a piece of tubular bar stock rather than by machining it from solid bar stock. The advantage of manufacturing the insert by this method is that it substantially reduces the scrap and thus the ultimate cost of the part. In fact, this method reduces the cost of the material from which the part is made by as much as 30% over the method practiced commercially for producing the millions of inserts used in the automobile industry today.

Inserts for tubeless tires conventionally consists of three different diameter sections; a large diameter end, an intermediate diameter middle section, and a small diameter end. The large diameter end has internal threads for the reception of a threaded section of the tire valve core and external threads for reception of the conventional dust cap. Connecting the large threaded end and the smaller diameter intermediate section is an internally tapered valve seat. Surrounding this valve seat is a heavy external flange having a flat upper surface adapted to be seated upon a mold surface when a rubber sleeve is molded around the insert.

During the era of tires having inner tubes, it was proposed that tire valve inserts be made from tube or sheet metal. However, no one has been able to economically accomplish that end since the advent of the tubeless tire. The primary reason that no one has been able to do so has been because the old methods by means of which tube type inserts were made from sheet metal are no longer practical with tubeless type tire valve inserts. Specifically, the old tube type inserts were made by either drawing a sleeve to the proper configuration by a series of drawing operations or they were configurated by reducing the diameter of various sections of a large tube so as to bring it to the proper configuration. Neither of these approaches is practical with a tubeless type tire valve insert.

The old approach to forming tire valve inserts from sheet metal by drawing the tube to its various configurations is impossible with tubeless type inserts because of the length to diameter ratio of the inserts used in modern tubeless tires.

As for the use of reducing techniques to form the tubeless type inserts, this is impractical because of the fins which result from this type of forming as well as because of the uncontrolled change of length of the tube which results. If the tapered valve seat were formed by crimping a larger diameter tube, the tapered section would have an internal and external fin, the internal fin being in the nature of a depression in the area where the tube crimping dies meet. Such a depression would be completely unsatisfactory if the tapered area is to serve as a sealed valve seat and could only be eliminated by a machining operation. If machined, the wall thickness would in all probability be too thin for a satisfactory insert.

I have discovered that tubeless type tire valve inserts may be made from tubes of generally uniform diameter and wall thickness by a series of expanding operations. In other words, a satisfactory tubeless tire valve insert may be made with its attendant savings in material and cost of production by expanding a small diameter tube rather than by the old conventional method of crimping or reducing in diameter a large diameter tube to configurate it.

One of the advantages of expanding the tube rather than reducing it in diameter to form a properly configurated sleeve or insert is that this may be accomplished on a punch press. As is well known, punch presses operate at speeds approximately twice that of screw machines. This results in a savings of both labor and capital.

These and other objects and advantages of this invention will be more readily apparent from a description of the drawings in which:

FIGURE 1 is a perspective view of a conventional pneumatic tire incorporating a tire valve insert of the type produced by this invention, FIGURE 2 is a cross sectional view taken along the line 2—2 of FIGURE 1 with the tire valve core being shown in phantom, FIGURE 3 is a sleeve of the type from which the insert of FIGURE 2 is made, FIGURES 4 through 14 illustrate diagrammatically the various forming operations in practicing the method of this invention, FIGURES 15 through 18 illustrate alternative small end configurations of the inserts and the method for producing those ends, FIGURES 19 and 20 illustrate diagrammatically the final threading of the completely formed or shaped insert.

Referring to FIGURE 2, it will be seen that the finished product manufactured by practicing this invention has a large externally threaded end section 10 beneath which it is slightly reduced in diameter and internally threaded on a section designated by the numeral 11. Beneath this internally threaded section 11 is an external flange or rib 12 which serves to locate the insert in a tire mold. Beneath this flange is a tapered valve seat section 13. The tapered section ends in a small diameter section 14 beneath which the sleeve is bulged at 15 for the middle section of the valve insert. The bulged section ends in a small diameter end section 16 which serves as a washer or spring seat as is more fully explained hereinafter.

In use, this sleeve or insert 5 becomes the center section of a molded rubber subassembly. The molded rubber 6 forms a sleeve around the insert and it is this sleeve 6 which is placed in the metal wheels of a tubeless tire.

The rib 12 serves as a seating surface when the molded rubber sleeve 6 is molded around the insert. As may be seen most clearly in FIGURE 2, the upper surface of the rib is flat and forms a 90° corner with the exterior of the internally threaded section 11. During the rubber molding operation, a pin (not shown) is inserted into the smaller diameter section 16 so as to seal this end of the insert against the ingress of rubber. This pin has a shoulder which rests against the small end of the insert and forces the top surface of the rib 12 into tight engagement with the mold so as to preclude rubber escaping from the mold and forming flash around the exterior of the threaded section 11. Because of the axial force applied to the rib 12 during the molding operation, it is made of double thickness tubing.

The tire valve is completed by a core indicated generally by the numeral 20 and shown in phantom in FIGURE 2. Since the core forms no part of this invention and is only described and shown herein in order to illustrate the function of the various sections and configurations of the insert, it will be only briefly described. Essentially, it consists of a center pin 21 having bulbous sections at each end. Intermediate the ends of the center pin are a pair of sleeves 22, 23 secured to the pin so as to hold a rubber seal 24 between them. A washer or shoe 25 is slidably mounted over the lower end of the center pin with its lowermost end 26 resting against the small end section 16 of the insert. Between the shoe and the bottom of the sleeve 22 is a compression spring 28 which biases the center pin into a closed position. A brass sleeve 30 surrounds the upper end of the center pin. This sleeve has external threads 31 threaded into the internal threads 32 of the insert or valve stem. When the core is initially assembled into the valve, this threaded upper end section is screwed down into the internally threaded section of the core until a Teflon sleeve 33 seats upon the internally tapered section 13 of the insert. When the Teflon sleeve is seated upon the tapered section, the lower end 34 of the brass sleeve 30 rests against the upper surface of the rubber seal 24 so as to form a pneumatic seal with that gasket.

When the center pin 21 is pushed downwardly against the bias of the spring 28, an area between the lower end 34 of the brass sleeve and the gasket 24 opens so as to permit air to pass either into or out of the interior bore 36 of the sleeve 30, via the gap between the sleeve 30 and the gasket 24, through the lower section of the bore of the insert, and through apertures (not shown) in the washer or shoe 25 to or from the interior of the tire.

Referring now to FIGURE 3, it will be seen that the tire valve insert 5 is made from a section of brass tubing indicated generally by the numeral 7. This section of tubing 7 is cut to proper length from tubular bar stock. Thereafter, the tubing 7 is formed into a completed insert as shown in FIGURE 2 upon an automatic indexed table punch press or a shuttle rail press in which the part is indexed between stations automatically until the tube has been completely formed. Thereafter, the configurated tube is transferred to a tapping machine which places the internal threads 32 and the external threads 40 on the completed insert. Since neither the punch press nor the transfer mechanism form any part of this invention and would only serve to unnecessarily complicate the drawings, they have not been illustrated.

The first step in the production of the insert is to locate the tubular sleeve 7 between a pair of male punches or dies 50, 51 each of which is surrounded by steel sleeves 52, 53 respectively. The sleeves 52, 53 are spaced from the punches 50, 51 slightly more than the thickness of the tubular sleeve 7 so that the tube 7 may enter between the punches and the sleeves. Punch 50 is slightly larger than the initial bore of the tube 7 so that as the tapered end 54 of punch 50 enters the upper end of the tube, it opens or enlarges the end 55. It should be noted that the punch 50 is slightly longer than the sleeve 52 so that a gap occurs between the flat end 56 of the sleeve 52 and the curved upper end 57 of the sleeve 53. This gap permits the metal of the brass sleeve 7 to flow outwardly between the sleeves 52, 53 so as to form a double thickness rib 12 on the periphery of the tube. Simultaneous with the forming of the rib, the upper end 55 of the sleeve is cold headed or axially compressed so as to increase the wall thickness of this section of the tube. The rib 12 is formed and the wall thickness of the upper section 55 of the tube is increased when the bottom 59 of an upper die engages the upper end of the tube so as to push the upper end of the tube downwardly. In so doing, it forces the upper end of the tube to compress to the dimension between the sleeve 52 and the punch 50 which is slightly greater than that of the starting tube wall thickness. In one preferred embodiment of the invention, the internal diameter of the upper end of the tube is increased from .156″ to approximately .168″ during the step of forming the rib 58 on the tube and the wall thickness is increased from .032″ to .045″.

The next step in the forming of the tube is to further expand the diameter of the upper section 55 of the tube and to further increase the wall thickness of this section. In a preferred embodiment, this diameter is expanded from .168″ to .180″ during this second step as the wall thickness is increased to .050″. This is accomplished by a second punch 60 having a tapered end 61. The punch 60 is surrounded by a sleeve 62 so that the wall thickness of the upper section 55 may be further increased by a cold heading operation when the bottom 63 of the upper die engages the upper end of the tube 7. During this operation, the lower end of the tube is reinforced by either the same punch 51 and sleeve 53 used in the first operation or a similarly dimensioned punch and sleeve.

After the punches 51, 60 and the surrounding supporting sleeves 53, 62 are removed (FIGURE 6), the lower end 65 of the tube 7 is bulged by a male die or punch. In the preferred embodiment, this male die expands the lower end of the tube from its original diameter of .156″ to .170″. After the lower end of the tube has been sized or expanded by the die 66, the underside of the rib 12 is engaged by a pair of stirpper plates or a cushion knockout (not shown) which hold the tube 7 and enable the punch 66 to be pulled (FIGURE 8) from the tube.

The next step in the production of the insert (FIGURE 9) is to open or increase the internal diameter of the upper portion 70 of top section 55 while simultaneously rough forming the tapered valve seat section 13. To this end, a male die 71 is inserted through the top of the tube. This die has a lower tapered end 72, a cylindrical middle section 73 and an enlarged cylindrical upper end section 74 joined to the middle section by a tapered section 75. As this male punch or die 71 is inserted into the tube, the tapered end section 72 of the die forms a taper on the tube section 13 by bulging it outwardly while simultaneously the upper end section 74 of the die opens or expands the very top portion of the tube. In the described embodiment, the very topmost portion of the tube is expanded to .302″.

After this operation, the die 71 is removed while the insert is engaged by a pair of stripper plates 76 (FIGURE 10).

The tube 7 then undergoes a final sizing operation by a male punch or die 78 which enters the tube and engages the tapered portion 13 to finally size this section. In the preferred embodiment, this section is tapered to a 17° angle. Thereafter, the tube is again engaged by a pair of stirpper plates 79 which secure it against movement while the dies 78 is removed.

The small end of the tube 65 is thereafter crimped as shown in FIGURES 11 and 12 to form a washer or spring engaging small diameter section 16. This is accomplished by a pair of semicylindrical discs 80 being moved laterally into engagement with the end section. Alternatively, the small end of the tube may be formed by a female die 81 being moved axially and forced over the end of the tube to form a generally tapered end section 82 as shown in FIGURE 15. As still another alternative, the small end of the tube 16 may be formed by a female die 83 being moved axially over the tube to form a cylindrical small end section (FIGURE 16). As still another alternative, a pair of semicylindrical discs similar in cross sectional configuration to those illustrated in FIGURE 12 but of lesser thickness may be moved laterally into engagement with the tube to form an arcuate interior rib 84 (FIGURE 17) or a flat rib 85 as illustrated in FIGURE 18.

All of the forming operations should be carried out as rapidly as possible so that from the first to the last step the metal will be continuously heated as it is worked and not allowed to cool. In this way maximum malleability of the metal will be achieved.

After the complete forming of the tube as hereinabove described, internal threads 32 are placed on the end section 11 by a tap 90 (FIGURE 19) and external threads 40 are threaded onto the large end section 10 by a female tap 91 (FIGURE 20).

It should be noted that during the forming of the insert, the sections 10 and 11 are increased in thickness by the cold heading operations. Preferably the increase in wall thickness is at least 30% during the forming of the piece. Additionally, it should be noted that the external and internal threads are not coextensive. In other words, the external threads end before the internal threads begin so that minimum thickness material may be used in the area of the threads.

While dimensions have been given to a preferred embodiment of the invention to facilitate an understanding of it, and while preferred embodiments of the invention have been illustrated, numerous changes and modifications of this invention will be readily apparent to those skilled in the art without departing from the spirit of the invention. Therefore, I intend only to be limited by the appended claims.

Having described my invention, I claim:

1. The method of manufacturing a pneumatic valve stem insert from a cylindrical metal tube of uniform wall thickness which comprises:
   compressing said tube axially between a pair of opposed confining dies to form a peripheral flange on said tube intermediate the ends of said tube,
   expanding a first section of said tube located between said flange and one end of the tube to increase the diameter of said first section simultaneously with the said compressing of said tube,
   increasing the wall thickness of said first section of said tube simultaneously with the said expanding of said first section of said tube,
   expanding a second section of said tube at least partially located between said flange and the other end of said tube,
   forming an internal taper on a third portion of said tube located between said second portion and said flange,
   expanding the end portion of said first section to increase the diameter of said portion beyond that of the remaining portion of said first section, and
   threading the external surface of said end portion and the internal surface of said remaining portion.

2. The method of manufacturing a pneumatic valve stem insert from a cylindrical metal tube of uniform wall thickness which comprises:
   compressing said tube axially to form a peripheral flange on said tube intermediate the ends of said tube,
   radially expanding a first section of said tube located between said flange and one end of the tube to increase the diameter of said first section,
   axially compressing said first section to increase the wall thickness of said section of said tube by at least 30 percent,
   radially expanding to form an internal taper on a second section of said tube at least partially located between said flange and the other end of said tube,
   expanding the end portion of said first section to increase the diameter of said portion beyond that of the remaining portion of said first section, and
   threading the external surface of said end portion and the internal surface of said remaining portion.

3. The method of manufacturing a pneumatic valve stem insert from a cylindrical metal tube of uniform wall thickness which comprises:
   compressing said tube axially to form a peripheral flange on said tube intermediate the ends of said tube,
   radially expanding a first section of said tube located between said flange and one end of the tube to increase the diameter of said first section,
   axially compressing said first section to increase the wall thickness of said section of said tube,
   radially expanding to form an internal taper on a second section of said tube at least partially located between said flange and the other end of said tube,
   expanding the end portion of said first section to increase the diameter of said portion beyond that of the remaining portion of said first section, and
   threading the external surface of said end portion and the internal surface of said remaining portion.

4. The method of manufacturing a pneumatic valve stem insert from a cylindrical metal tube of uniform wall thickness which comprises:
   compressing said tube axially to form a peripheral flange on said tube intermediate the ends of said tube,
   radially expanding a first section of said tube located between said flange and one end of the tube to increase the diameter of said first section,
   axially compressing said first section to increase the wall thickness of said section of said tube by at least 30 percent,
   radially expanding a second section of said tube located between said flange and the other end of said tube,
   radially expanding to form an internal taper on a third section of said tube at least partially located between said second section and said flange,
   radially compressing a portion of said second section adjacent said other end of said tube,
   expanding the end portion of said first section to increase the diameter of said portion beyond that of the remaining portion of said first section, and
   threading the external surface of said end portion and the internal surface of said remaining portion.

5. The method of manufacturing a pneumatic valve stem insert from a cylindrical metal tube of uniform wall thickness which comprises:
   comprising said tube axially to form a peripheral flange on said tube intermediate the ends of said tube,
   radially expanding a first section of said tube located between said flange and one end of the tube to increase the diameter of said first section,
   axially compressing said first section to increase the wall thickness of said section of said tube,
   radially expanding a second section of said tube to form an internal taper on a portion at least partially located between said flange and the other end of said tube, radially expanding a third section of said tube located between said second section and the other end, radially compressing a fourth section located immediately adjacent the said other end, and threading said first section both internally and externally.

6. The method of manufacturing a pneumatic valve stem insert from a cylindrical metal tube of uniform wall thickness which comprises:

compressing said tube axially to form a peripheral flange on said tube intermediate the ends of said tube, radially expanding a first section of said tube located between said flange and one end of the tube to increase the diameter of said first section, radially expanding a second section of said tube to form an internal taper on a portion at least partially located between said flange and the other end of said tube, radially expanding a third section of said tube located between said second section and the other end, radially compressing a fourth section located immediately adjacent the said other end, and threading said first section both internally and externally.

7. The method of manufacturing a pneumatic valve stem insert from a cylindrical metal tube of uniform wall thickness which comprises:

compressing said tube axially to form a peripheral flange on said tube intermediate the ends of said tube, radially expanding a first section of said tube located between said flange and one end of the tube to increase the diameter of said first section, radially expanding a second section of said tube to form an internal taper therein, said internal taper being at least partially located between said flange and the other end of said tube, and threading said first section both internally and externally.

8. The method of manufacturing a pneumatic valve stem insert from a cylindrical metal tube of uniform wall thickness which comprises:

compressing said tube axially to form a peripheral flange on said tube intermediate the ends of said tube, radially expanding a first section of said tube located between said flange and one end of the tube to increase the diameter of said first section, radially expanding a second section of said tube to form an internal taper within said second section of said tube, said internal taper being at least partially located between said flange and the other end of said tube, expanding the end portion of said first section to increase the diameter of said portion beyond that of the remaining portion of said first section, and threading the external surface of said end portion and the internal surface of said remaining portion.

9. An improved method for producing a tire valve stem insert from a cylindrical metal tube of minimum uniform wall thickness and adapted to employ a punch press for obtaining high speed production in a precise configuration, comprising the steps of inserting at least one punch into the interior of said tube and axially compressing said tube within confining dies while said punch is located within said tube to form an outwardly projecting peripheral flange intermediate the ends of said tube which provides a rigid annular locating surface, axially compressing a first section of said tube located between said flange and one end of the tube to increase the wall thickness of said section for receiving threads, inserting a tapered punch into the interior of said tube and moving said tapered punch axially to expand the interior of said tube and form an internal taper within a second section of said tube located adjacent said flange, and threading said first section both internally and externally.

References Cited

UNITED STATES PATENTS

| | | | |
|---|---|---|---|
| 1,724,426 | 8/1929 | Schweinert | 29—157.1 |
| 1,893,711 | 1/1933 | Malby | 29—157.1 |
| 2,813,568 | 11/1957 | Kilmark | 152—427 |
| 2,818,101 | 12/1957 | Boyer | 152—427 |
| 613,917 | 11/1898 | Welch | 137—223 |
| 1,761,487 | 6/1930 | Oakley | 137—223 XR |
| 2,313,139 | 3/1943 | Funk | 72—392 |
| 2,232,530 | 2/1941 | Hosking | 137—223 |
| 2,557,722 | 6/1951 | Brauchler | 72—393 |

JOHN F. CAMPBELL, *Primary Examiner.*

R. B. LAZARUS, *Assistant Examiner.*

PO-1050
(5/69)

UNITED STATES PATENT OFFICE
CERTIFICATE OF CORRECTION

Patent No. 3,441,997           Dated May 6, 1969

Inventor(s) James F. Scherer

It is certified that error appears in the above-identified patent and that said Letters Patent are hereby corrected as shown below:

Column 5, Line 1, delete "stirpper" and insert --stripper--.
Column 6, Line 66, delete "comprising" and insert --compressing--.

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents